United States Patent
Romero et al.

(10) Patent No.: US 8,408,066 B1
(45) Date of Patent: Apr. 2, 2013

(54) HIGH FORCE VIBRATION TESTING WITH WIDE FREQUENCY RANGE

(75) Inventors: Edward F. Romero, Albuquerque, NM (US); Richard A. Jepsen, Albuquerque, NM (US); Danny Lynn Gregory, Corrales, NM (US)

(73) Assignee: Sandia Corporation, Albuquerque, NM (US)

( * ) Notice: Subject to any disclaimer, the term of this patent is extended or adjusted under 35 U.S.C. 154(b) by 241 days.

(21) Appl. No.: 12/911,383

(22) Filed: Oct. 25, 2010

(51) Int. Cl.
*G01M 7/02* (2006.01)
*H01L 41/04* (2006.01)

(52) U.S. Cl. .............. 73/663; 73/761; 310/328

(58) Field of Classification Search .......... 73/663, 73/662, 665, 66, 667, 668, 761, 763; 310/328
See application file for complete search history.

(56) References Cited

U.S. PATENT DOCUMENTS

| | | | |
|---|---|---|---|
| 4,181,028 A * | 1/1980 | Talbott, Jr. ............. | 73/665 |
| 4,489,612 A * | 12/1984 | Griggs .................. | 73/663 |
| 4,715,229 A * | 12/1987 | Butts ................... | 73/663 |
| 4,733,151 A * | 3/1988 | Butts ................... | 318/645 |
| 5,641,910 A * | 6/1997 | Middleton ............. | 73/668 |
| 5,804,732 A * | 9/1998 | Wetzel et al. ......... | 73/663 |
| 6,131,461 A * | 10/2000 | Leist ................... | 73/662 |
| 6,502,464 B1 * | 1/2003 | Hobbs .................. | 73/663 |
| 6,860,152 B2 * | 3/2005 | Lund et al. ........... | 73/663 |
| 6,904,807 B1 * | 6/2005 | Butts ................... | 73/662 |
| 2004/0140737 A1 | 7/2004 | Barillot et al. | |
| 2004/0189145 A1 * | 9/2004 | Pletner et al. ........ | 310/311 |

OTHER PUBLICATIONS

Aircraft Ground Vibration Testing at the Nasa, Kehoe et al., 1993.*
J.D. Rodgers et al, "Vibrafuge: Combined Vibration and Centrifuge Testing," *Shock and Vibration Symposium*, Virginia Beach, VA, Nov. 1989, 10 pages.
VanGoethem, et al, "Vibrafuge: Re-entry and Launch Test Simulation in a Combined Linear Acceleration and Vibration Environment" 44th AIAA Aerospace Sciences Meeting and Exhibit, Jan. 9-12, 2006, Reno, Nevada, 8 pages.

* cited by examiner

*Primary Examiner* — J M Saint Surin
(74) *Attorney, Agent, or Firm* — Scott B. Stahl

(57) ABSTRACT

A shaker assembly for vibration testing includes first and second shakers, where the first shaker includes a piezo-electric material for generating vibration. A support structure permits a test object to be supported for vibration of the test object by both shakers. An input permits an external vibration controller to control vibration of the shakers.

20 Claims, 3 Drawing Sheets

HIGH FORCE VIBRATION TESTING WITH WIDE FREQUENCY RANGE

This invention was developed under Contract DE-AC04-94AL85000 between Sandia Corporation and the U.S. Department of Energy. The U.S. Government has certain rights in this invention.

FIELD OF THE INVENTION

The present work relates generally to vibration testing and, more particularly, to generation of wide frequency band vibration forces.

BACKGROUND OF THE INVENTION

Conventional shakers used for vibration testing are limited in their ability to effectively apply a wide range of vibration frequencies to test objects of different masses. For effective vibration testing, the shaker must produce an output vibration force that is suitably proportional to the mass of the test object. As an example, conventional hydraulic shakers are generally not capable of generating vibration at relatively high frequencies (e.g., greater than about 300 Hz). On the other hand, conventional electro dynamic shakers are technically capable of generating sufficiently high output force at relatively high frequencies, but with attendant high electrical power consumption and associated expense. Conventional piezo-electric (PE) actuators are capable of producing sufficiently high output force at relatively high vibration frequencies, but have limited ability to generate that same level of force at relatively low vibration frequencies (e.g., less than about 200 Hz).

It is desirable in view of the foregoing to provide for application of high output vibration forces across a range of vibration frequencies that is wider than permitted by conventional technology.

DETAILED DESCRIPTION

Exemplary embodiments of the present work mount the unit under test (test object) to a test platform connected to a PE shaker and mount the test platform with the PE shaker to the head of a further shaker, thus providing combined excitation to the unit under test. The further shaker, for example a hydraulic or electro dynamic shaker, generates controlled vibration for a relatively lower frequency range (e.g., 5-400 Hz), and the PE shaker generates controlled vibration for a relatively higher frequency range (e.g., 400-2,000 Hz). The further shaker serves as a reaction mass to the PE shaker. In some embodiments, a single accelerometer is used to control both shakers. In various embodiments, the shakers operate in various frequency ranges depending on shaker and test specifications.

Figure 1:
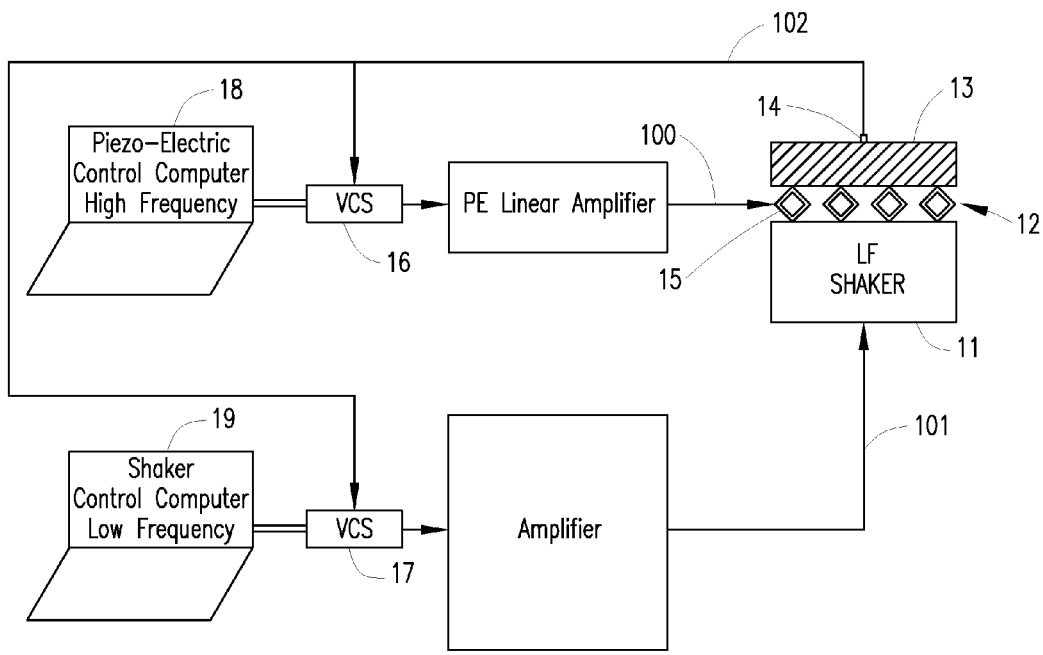
FIG. 1 diagrammatically illustrates an apparatus for vibration testing according to exemplary embodiments of the present work.

FIG. 1 diagrammatically illustrates an apparatus for vibration testing according to exemplary embodiments of the present work. FIG. 1 shows a shaker assembly that includes at 12 an arrangement of conventional PE vibration actuators 15 that collectively constitute a first shaker, also referred to herein as a PE shaker or a high frequency shaker. The PE shaker is mounted on a second shaker 11, for example, a conventional hydraulic shaker or a conventional electro dynamic shaker. The second shaker 11 (also referred to herein as a low frequency shaker or LF shaker) provides high output force vibration in a relatively lower frequency range (5-400 Hz in some embodiments), and the first shaker 12 provides high output force vibration in a relatively higher frequency range (400-2,000 Hz in some embodiments).

A test object 13 is mounted on the PE shaker 12. A control accelerometer 14 provided on the test object 13 provides a feedback control signal 102 indicative of vibration of the test object. In some embodiments, the accelerometer is provided on the PE shaker 12. The feedback control signal 102 from the accelerometer 14 is provided to a control system, for use in controlling vibration of the shakers 11 and 12. In the embodiments illustrated by FIG. 1, the control system includes conventional SISO (single input, single output) vibration controllers 16 and 17, which are responsive to the signal 102 for respectively controlling the vibration produced by shakers 12 and 11. The various vibration controllers described herein are also referred to by "VCS" (vibration control system). The SISO controllers 16 and 17 receive further control input from respective control computers 18 and 19. The control computers 18 and 19 are programmed with specifications of the desired vibration test operations to be implemented by the respective shakers 12 and 11, and operate, according to conventional techniques, to provide the respective SISO controllers 16 and 17 with control information indicative of the desired vibration test operations. As shown in FIG. 1, output control signals produced by the SISO controllers 16 and 17 are amplified by conventional amplifiers, and the resulting amplified control signals 100 and 101 are respectively provided to the shakers 11 and 12.

As indicated above, in some embodiments, the LF shaker 11 may be activated to vibrate the test object 13 (along with the PE shaker) in a range of, for example, 5-400 Hz, and the PE shaker 12 may be activated to produce vibration in a range of, for example, 400-2,000 Hz. Advantageously, a test object of, for example, 5 lbs. or more, may be vibrated with sufficient force, across the entire 5-2,000 Hz frequency range of this example, with the test object mounted on the single shaker assembly of FIG. 1. In various embodiments, the PE and LF shakers are cooperable to vibrate objects of various weights across various frequency ranges.

Figure 2:
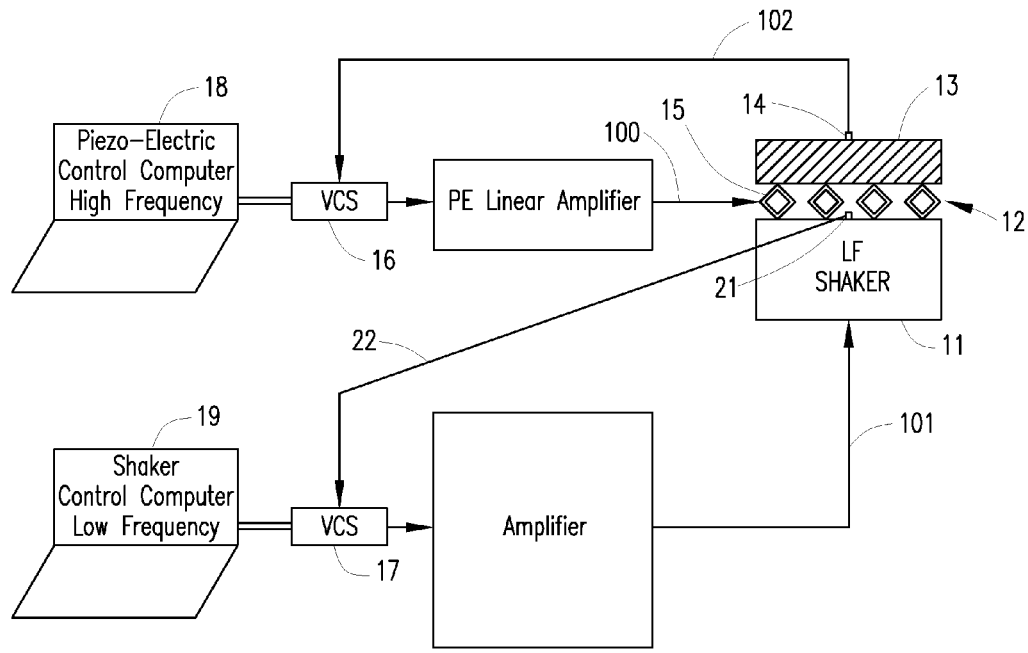
FIG. 2 diagrammatically illustrates an apparatus for vibration testing according to further exemplary embodiments of the present work.

In some embodiments, the LF shaker 11 provides vibration along a first axis from 15-200 Hz, and the PE shaker 12 provides vibration along a second axis from 200-2,000 Hz, with the first axis generally perpendicular to the second axis. For example, the first axis may be horizontal and the second axis may be vertical. In some embodiments, the respective shakers have parallel vibration axes. Some embodiments provide multiple pairs of these parallel vibration axes, with the parallel axis pairs arranged orthogonally relative to one another to create multi-axis vibration FIG. 2 diagrammatically illustrates another apparatus for vibration testing according to further exemplary embodiments of the present work. The apparatus of FIG. 2 is similar to that of FIG. 1, except a further control accelerometer 21 is provided on the LF shaker 11 to provide a further feedback control signal 22 indicative of vibration of the shaker LF 11. The SISO controller 17 receives this further feedback control signal 22 instead of the feedback control signal 102. The separate feedback control signals 22 and 102 are useful, for example, in embodiments wherein the shakers 11 and 12 are operated simultaneously to subject the test object 13 to a resultant combination of vibration forces produced by both shakers.

Figure 3:
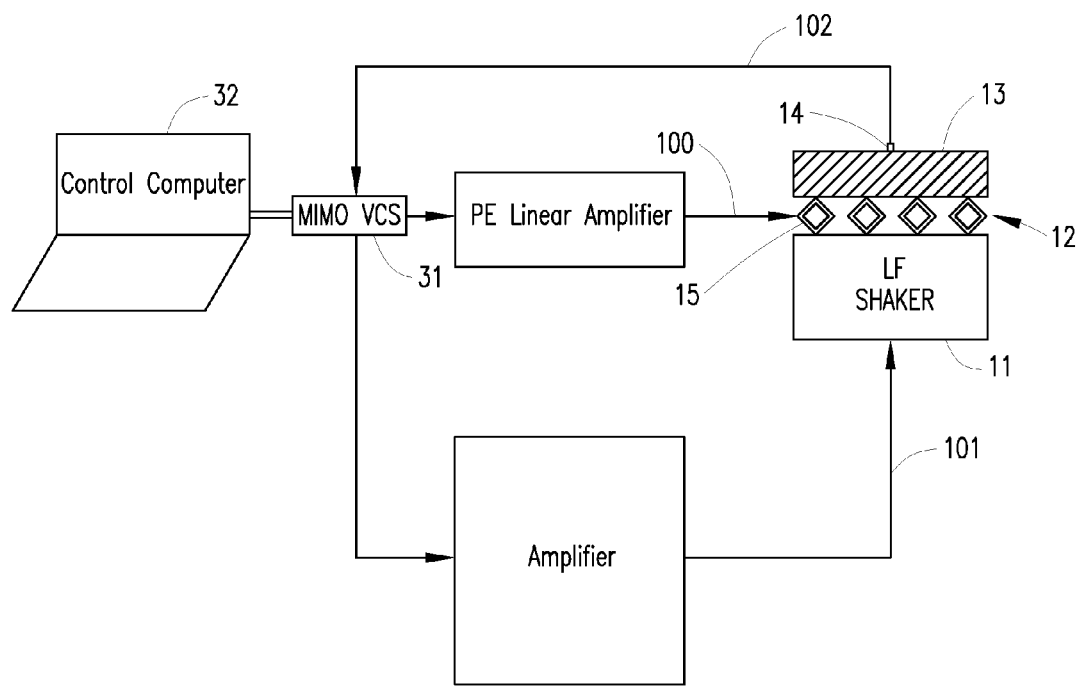
FIG. 3 diagrammatically illustrates an apparatus for vibration testing according to still further exemplary embodiments of the present work.

FIG. 3 diagrammatically illustrates another apparatus for vibration testing according to further exemplary embodiments of the present work. The apparatus of FIG. 3 is similar to that of FIG. 1, except the SISO controllers 16 and 17, and the control computers 18 and 19, are replaced by a single MIMO (multiple input, multiple output) controller 31 and an associated control computer 32. The MIMO controller 32 is responsive to the feedback control signal 102 for implementing conventional MIMO control operations to produce control signals for both shakers 11 and 12. The control computer 32 is programmed with specifications of the desired vibration test operations to be implemented by both shakers 11 and 12, and operates, according to conventional techniques, to provide the MIMO controller 31 with control information indicative of the desired vibration test operations.

Figure 4:
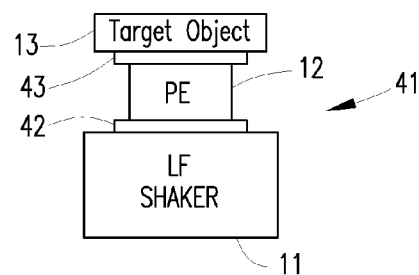
FIG. 4 diagrammatically illustrates the shaker assembly of FIGS. 1-3 in more detail according to exemplary embodiments of the present work.

FIG. 4 illustrates the shaker assembly of FIGS. 1-3 in more detail according to exemplary embodiments of the present work. In the example shaker assembly 41 of FIG. 4, the PE shaker 12 is mounted to a mounting structure 43 that is adapted to mount the target object 37 to the PE shaker 12. Another mounting structure 42 is mounted to the PE shaker 12 opposite the mounting structure 43. The mounting structure 42 mounts the PE shaker 12 to the LF shaker 11. In addition to providing low frequency vibration, the LF shaker 11 provides a reaction mass for the PE shaker 12.

Figure 5:
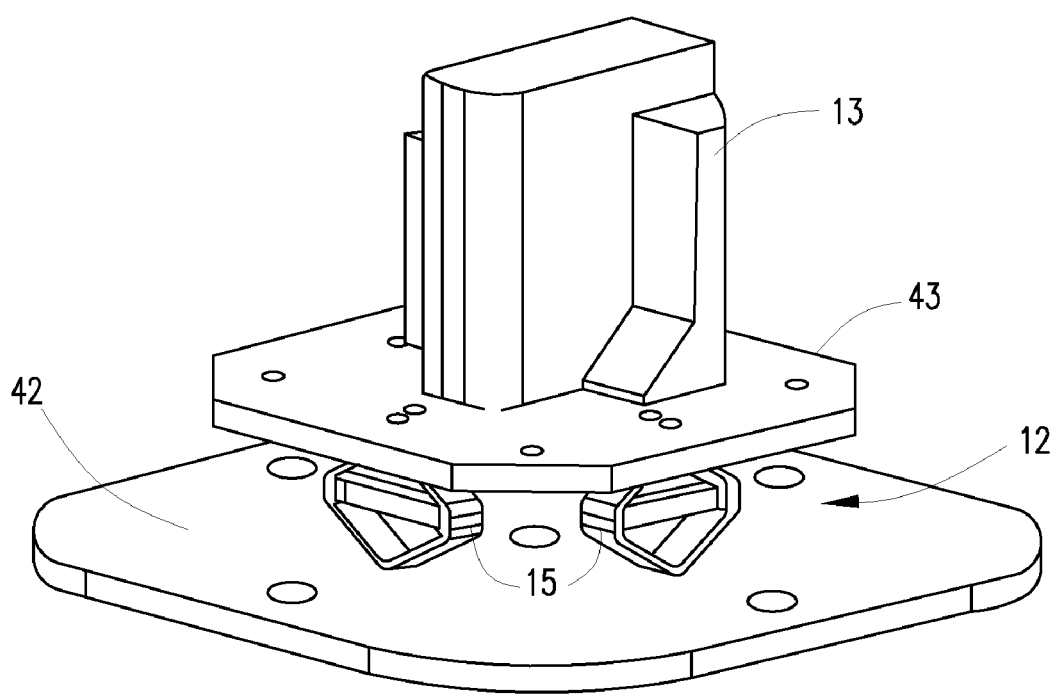
FIG. 5 illustrates structural mounting and connection details of the shaker assembly of FIGS. 1-4 according to exemplary embodiments of the present work.

FIG. 5 illustrates a still more detailed example of the shaker assembly 41 of FIG. 4 according to exemplary embodiments of the present work. The mounting structures 42 and 43 are rigid plates in the example of FIG. 5. The plates 42 and 43 have provided therein respective patterns of holes that provide PE actuator mounting sites. The PE actuators 15 (see also FIG. 1) are interposed between and bolted (or otherwise suitably fastened) to the mounting plates 42 and 43 with the holes in the mounting plates 42 and 43 suitably aligned. The mounting plate 42 includes additional mounting holes for cooperation with mounting holes provided in the LF shaker 11 (not shown in FIG. 5), so the PE shaker 12 may be mounted on the LF shaker 11 using bolts or any other suitable type of attachment In some embodiments, the LF shaker 11 is The Cube™, a hydraulic shaker commercially available from Team Corporation.

Although the PE and LF shakers operate in substantially non-overlapping frequency ranges in the embodiments detailed above, in other embodiments, the PE and LF shakers operate in overlapping frequency ranges.

Although exemplary embodiments of the present work are described above in detail, this does not limit the scope of the work, which can be practiced in a variety of embodiments.

What is claimed is:

1. An apparatus for vibration testing, comprising:
a shaker assembly including first and second shakers, said shaker assembly configured to support a test object thereon for vibration of the test object by both of said shakers, said first shaker including a piezo-electric material for generating vibration, and said second shaker rigidly fastened to said first shaker and configured to generate vibration without using piezo-electric material; and
a control system coupled to said shakers for controlling vibration of the test object.

2. The apparatus of claim 1, wherein said first shaker is mounted on said second shaker and is configured to mount the test object thereon to permit said second shaker to vibrate said first shaker and the test object.

3. The apparatus of claim 2, wherein said control system includes a first input configured to receive a first feedback signal indicative of vibration of said first shaker.

4. The apparatus of claim 3, wherein said control system includes first and second SISO controllers coupled to said first input and responsive to said first feedback signal for respectively controlling vibration of said first and second shakers.

5. The apparatus of claim 3, wherein said control system includes a MIMO controller coupled to said first input and responsive to said first feedback signal for controlling vibration of said first and second shakers.

6. The apparatus of claim 3, wherein said control system includes a second input configured to receive a second feedback signal indicative of vibration of said second shaker.

7. The apparatus of claim 6, wherein said control system includes first and second SISO controllers respectively coupled to said first and second inputs and respectively responsive to said first and second feedback signals for respectively controlling vibration of said first and second shakers.

8. The apparatus of claim 2, wherein said second shaker is configured to produce vibration relative to a plurality of vibration axes.

9. The apparatus of claim 1, wherein said second shaker is one of a hydraulic shaker and an electro dynamic shaker.

10. The apparatus of claim 1, wherein said first and second shakers are respectively configured to vibrate the test object in first and second vibration frequency ranges, and wherein said first range is higher and wider than said second range.

11. The apparatus of claim 10, wherein said first and second ranges are substantially non-overlapping.

12. A shaker assembly for vibration testing, comprising:
a first shaker, including a piezo-electric material for generating vibration;
a second shaker rigidly fastened to said first shaker and configured to generate vibration without using piezo-electric material;
a support structure configured to permit a test object to be supported for vibration of the test object by both of said shakers; and
an input for permitting an external vibration controller to control vibration of said shakers.

13. The shaker assembly of claim 12, wherein said support structure includes said first shaker mounted on said second shaker and said first shaker configured to mount the test object thereon to permit said second shaker to vibrate said first shaker and the test object.

14. The shaker assembly of claim 13, including a first sensor positioned to sense vibration of said first shaker and configured to provide to the external vibration controller a first feedback signal indicative of said vibration of said first shaker.

15. The shaker assembly of claim 14, including a second sensor positioned to sense vibration of said second shaker and configured to provide to the external controller a second feedback signal indicative of said vibration of said second shaker.

16. The shaker assembly of claim 13, wherein said second shaker is configured to produce vibration relative to a plurality of vibration axes.

17. The shaker assembly of claim 12, wherein said input provides first and second control signals respectively to said first and second shakers.

18. The shaker assembly of claim 12, wherein said second shaker is one of a hydraulic shaker and an electro dynamic shaker.

19. The shaker assembly of claim 12, wherein said first and second shakers are respectively configured to vibrate the test object in first and second vibration frequency ranges, and wherein said first range is higher and wider than said second range.

20. The shaker assembly of claim 19, wherein said first and second ranges overlap one another.

\* \* \* \* \*